(12) United States Patent
Kouritzin

(10) Patent No.: US 7,058,550 B2
(45) Date of Patent: Jun. 6, 2006

(54) SELECTIVELY RESAMPLING PARTICLE FILTER

(75) Inventor: Michael A. Kouritzin, Edmonton (CA)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 10/877,879

(22) Filed: Jun. 25, 2004

(65) Prior Publication Data
US 2005/0049830 A1 Mar. 3, 2005

Related U.S. Application Data

(60) Provisional application No. 60/482,469, filed on Jun. 25, 2003.

(51) Int. Cl.
G06F 15/00 (2006.01)

(52) U.S. Cl. ..................... 702/189; 702/181

(58) Field of Classification Search ............... 702/189, 702/190, 179–181, 198, 199; 375/315, 341, 375/316; 706/46–48; 700/174; 166/255.1; 324/204; 250/397; 356/337, 484
See application file for complete search history.

(56) References Cited

U.S. PATENT DOCUMENTS

| | | | |
|---|---|---|---|
| 5,933,352 A * | 8/1999 | Salut | 700/174 |
| 2002/0198681 A1* | 12/2002 | Kouritzin et al. | 702/181 |
| 2004/0161059 A1* | 8/2004 | Andrieu | 375/341 |
| 2004/0168797 A1* | 9/2004 | Barrow | 166/255.1 |
| 2004/0174939 A1* | 9/2004 | Wang | 375/316 |

OTHER PUBLICATIONS

Ballantyne et al., "A hybrid weighted interacting particle filter for multi-target tracking," in *Signal Processing, Sensor Fusion, and Target Recognition XII, Ivan Kadar (Ed.), Proceedings of SPIE* vol. 5096 (2003): Title page, Publication Page, and pp. 244-255.

Ballantyne et al., "A novel branching particle method for tracking," in *Signal and Data Processing of Small Targets 2000, Oliver E. Drummond (Ed.), Proceedings of SPIE* vol. 4048 (2000): 277-287.

(Continued)

*Primary Examiner*—Michael Nghiem
*Assistant Examiner*—Xiuqin Sun
(74) *Attorney, Agent, or Firm*—Mueting, Raasch, & Gebhardt, P.A.

(57) ABSTRACT

A method, and program for implementing such method, for use in estimating a conditional probability distribution for past signal states, current signal states, future signal states, and/or complete pathspace of a non-linear random dynamic signal process, includes providing sensor measurement data associated therewith and state data including at least location and weight information associated with each of a plurality of particles as a function thereof. An estimate of the conditional probability distribution is compared for the signal state based on the state data for particles under consideration and such particles are resampled upon receipt of sensor measurement data. The resampling includes comparing weight information associated with a first particle (e.g., the highest weighted particle) with weight information associated with a second particle (e.g., the lowest weighted particle) to determine if the state data of the first and second particles is to be adjusted.

24 Claims, 9 Drawing Sheets

OTHER PUBLICATIONS

Ballantyne et al., "A Weighted Interacting Particle-based Nonlinear Filter," *Signal Processing, Sensor Fusion, and Target Recognition XI, Ivan Kadar (Ed.), Proceedings of SPIE* vol. 4729 (2002): 236-247.

Ballantyne et al., "Discrete-Space Particle Filters for Reflecting Diffusions," *Proceedings of the 2002 IEEE Aerospace Conference, Big Sky, Montana*, Mar. 9, 2002, pp. 4-1625 to 4-1633.

Bauer et al., "Continuous and Discrete Space Particle Filters for Predictions in Acoustic Positioning," *Image Reconstruction from Incomplete Data II*, Philip J. Bauer et al. (*Eds.*), *Proceedings of SPIE*, vol. 4792 (2000): 193-206.

Bhatt et al., "Robustness of the nonlinear filter," *Stochastic Process: Appl.*, vol. 81 (1999) pp. 247-254.

Di Masi et al., "Continuous-Time Approximations for the Nonlinear Filtering Problem," *Appl. Math. And Opt.*, 7:233-245 (1981).

Kim et al., "A stochastic grid filter for multi-target tracking," in *Signal Processing, Sensor Fusion and Target Recognition XIII*, Ivan Kadar (Ed), *Proceedings of SPIE*, vol. 5429 (2004): 245-253.

Kouritzin, "Exact Infinite Dimensional Filters and Explicit Solutions," *Canadian Mathematical Society, Conference Proceedings, Stochastic Models*, Proceedings of the International Conference on Stochastic Models in Honour of Professor Donald A. Dawson, Ottawa, Canada, Jun. 10-13, 1998, Gorostiza et al. (Eds), vol. 26 (2000): 265-282.

Kouritzin et al., "Markov chain approximations to filtering equations for reflecting diffusion processes," *Stochastic Processes and their Applications*, 110 (2004): 274-294.

Kushner, "A Robust Discrete State Approximation to the Optimal Nonlinear Filter for a Diffusion," *Stochastics*, vol. 3 (1979): 75-83.

* cited by examiner

Table Population for Dynamic Programming

Table Population for Reinforcement Learning

Figure 9.

$$\text{Weight}(\text{Particle } \xi j) = (1+\alpha)^{(\xi j.\text{getIndex}())}$$

$$\text{Particle.getIndex}() = \text{return this.hash\_index}$$

SELECTIVELY RESAMPLING PARTICLE FILTER

CROSS-REFERENCE TO RELATED APPLICATIONS

This application claims the benefit of U.S. Provisional Application No. 60/482,469, entitled "Selective Resampling Particle Filter and Implementation," filed 25 Jun. 2003, wherein such document is incorporated herein by reference.

BACKGROUND OF THE INVENTION

The present invention relates to efficient nonlinear asymptotically optimal tracking, smoothing, and prediction of dynamic processes in real time.

Many industries require a system to determine the location and state of a signal in some domain based upon corrupted, distorted, incomplete observations of this signal. For example, one might want to know the position, orientation, and velocity of an aircraft, collectively defining the signal, over a busy airport. Additionally, it might be important to know where the aircraft is likely to be in the future and what path it has taken in the past. In many such cases, complete information about the signal is not readily available. Instead, only distorted, corrupted, partial information given by discrete-time observations is provided.

In the aircraft example, the only data provided to the airport might be noisy transmissions of truncated altimeter readings and range data for the aircraft that arrive at two second intervals. Also, there could be more than one aircraft to estimate, increasing the signal size. While perfect determination of the signal state is impossible under these noisy observation circumstances, it may still be desirable to obtain probabilistic estimates of the state conditioned on the information that is available. Often, one might also obtain smoothed estimates of past signal states, probabilistic information on the likelihood of various signal paths, and predictions of future states given all observations up to some particular time.

More precisely, at least in one exemplary embodiment, the problem may be follows. Suppose the signal to be tracked is a discrete- or continuous-time Markov process. For example, it might be described by an Itô stochastic differential equation (SDE) defined on some probability space $(\Omega, F, P)$ $$dX_t = A(X_t)dt + B(X_t)dv_t, \quad (1)$$

where $X_t$ is the signal state at time t and $v_t$ is a standard d-dimensional Brownian motion or, more generally, the signal could be the solution to a Martingale problem on some state space. Let $\epsilon > 0$; set $t_m := m\epsilon$ for $m=1,2,\ldots$; take $h_m$ to be a time-varying, possibly nonlinear sensor function, and let $V_m$ be a sequence of independent random variables that model the noise input into this time-varying dependence. Generally, there are some discrete observations occurring at times $t_m$, and are dependent on the signal in a stochastic manner described by:

$$Y_m = h_m(X_{t_m}, V_m) \quad (2)$$

Such formulae might not be precisely known in a particular instance and some extra randomness or states or parameters can be introduced to model this implementation uncertainty. A special case, for example, to consider is when $V_m$ is additive noise. Then, the above equation can be rewritten as:

$$Y_m = h(X_{t_m}) + V_m \quad (3)$$

The requirement is to construct a device which can efficiently determine the conditional distribution of the state of the signal given all observations up to the current time, that is, $$P(X_t \in dx | \sigma\{Y_q, 0 \le t_q \le t\}). \quad (4)$$

Generally, this device is referred to as an optimal tracker. Also, the device should provide smoothers to estimate past signal states and predictors to estimate future signal states, that is, $$P(X_{\tau_s} \in dx | \sigma\{Y_q, 0 \le t_q \le t\}) \quad (5)$$

and $$P(X_{\tau_p} \in dx | \sigma\{Y_q, 0 \le t_q \le t\}) \quad (6)$$

where $\tau_s < t$ and $\tau_p > t$. Indeed, one is often interested in $$P(X_{[\tau_s, \tau_p]} \in dz | \sigma\{Y_q, 0 \le t_q \le t\}) \quad (7)$$

where z ranges over the possible path functions and $X_{[\tau_s, \tau_p]}$ represents the path of the signal between times $\tau_s$ and $\tau_p$.

In the specific Itô equation case in which the stochastic dynamics are given by A being linear, B being constant, the observations taking the form of equation (3) with h linear in X, and $\{V_m\}_{m=1}^{\infty}$ being an independent sequence of Gaussian random variables, an efficient recursive optimal tracker is already known: the Kalman filter. Recursive, in this context, means that the computation involved with producing the state estimate after a new observation requires the previous state estimate and the data of that observation with no direct reference to the data of any previous observation. This allows the Kalman filter to operate very quickly.

However, the Kalman filter has very stringent requirements on the possible signal dynamics and on the form of the sensor function. As well, it provides no direct method to provide predictors or smoothers. Despite these shortcomings, the Kalman filter is the core of many current devices to provide filtering solutions. In linear Gaussian additive environments, trackers based on the Kalman filter produce optimal estimates. For more general environments, the Kalman filter is suboptimal, but can still provide some solution in the form of the extended Kalman filter. Further developments of the Kalman filter have included running multiple Kalman filters in banks, each with different assumptions about the signal dynamics, and weighting the Kalman filters and their inputs to provide a track. This method is called the interacting multiple model tracker, and provides improved but still suboptimal tracking.

Other techniques have expanded the class of filtering problems that can be solved using exact methods. These techniques provide readily implementable computer algorithms through use of the fast Fourier transform that can be nearly as efficient as the Kalman filter and provide optimal solutions. However, the problems that can be solved in this manner still form a small subset of the whole space of real world problems.

One recent type of general solution to the filtering problem is a class of nonlinear particle system methods. Particle-based nonlinear filters are effective and versatile methods for computing approximations to filtering problems. The basic requirements for a particle method are simulation of independent samples of the signal, called particles, with the same law as the signal, and the re-sampling of these particles to incorporate observation information effectively. Then, a high-particle limit of an empirical measure for the resulting particle system can be anticipated to exist and yield the conditional distribution of the signal at a particular time given the back observations.

These particle-based techniques simulate a large number $N_t$ of independent particles at each time t. In one or more circumstances, it may also have a path state denoted by $\xi_{[\tau_s,\tau_p]}^j$ for the paths of $\xi^j$ over the time interval $[\tau_s,\tau_p]$. The jth particle has current state denoted by $\xi_t^j$. The set of particles $\{\xi_t^j, 0 \leq j \leq N_t\}$ are adjusted in some manner to conform to each observation by either assigning each particle a scalar weight value or by interchanging the state values associated with each particle in some manner, for example, as described in U.S. Pat. No. 5,933,352 issued Aug. 3, 1999 to Salut, entitled "Method and a system for non-linear optimal estimation of dynamic processes in real time."

Such particle based techniques may be applied to filtering continuous- or discrete-time Markov process signals based upon observations of the form, for example, as shown in equation (2). The conditional distribution of the signal state at the current time is approximated by the locations of the particles and their weights, specifically. A scalar value $W_m(\xi^j)$ is calculated for the jth particle $\xi^j$ to account for the information from the mth observation according to the formula:

$$W_m^j = W_m(\xi^j) = \frac{\theta_m(g_m(Y_m, \xi^j))J_m(Y_m, \xi^j)}{\theta_m(Y_m)}, \quad (8)$$

where $\theta_m$ is the density function for the random variable $V_m$ that models the noise input, $g_m(Y_m,\xi)$ is the inverse map for each fixed $\xi$ of the function $h_m(\xi,V_m)$ in equation (2), and $J_m(Y_m,\xi)$ is the determinant of the matrix $$\left\{\frac{\partial g_m^i}{\partial Y_m^k}(Y_m, \xi)\right\}_{i,k=1}^l.$$

When the observation is modeled as equation (3) and $\{V_m\}$ is a centered independent and identically distributed sequence of Gaussian random variables, the above equation (8) simplifies to:

$$W_m^j = W_m(\xi^j) = \exp\left(\frac{h(\xi^j) \cdot Y_m}{\varepsilon\sigma^2} - \frac{h^2(\xi^j)}{2\varepsilon\sigma^2}\right) \quad (9)$$

where $\sigma^2$ is the variance of the Gaussian noise.

These scalar values in equation (8) multiply the previous weight to update the current weight of the jth particle $W_{1,m}(\xi^j)=W_{1,m-1}(\xi^j)W_m(\xi^j)$ so as to include the mth observation, where $W_{1,m-1}(\xi^j)$ denotes its weight based upon the first m−1 observations. The raw conditional distribution approximations using particles $$\{\xi^j\}_{j=1}^{N_{t_m}}$$

with corresponding weights $$\{W_{1,m}(\xi^j)\}_{j=1}^{N_{t_m}}$$

after the mth observation are $$P(X_{t_m} \in A \mid Y_1, \ldots, Y_m) \approx \frac{1}{\sum_{j=1}^{N_{t_m}} W_{1,m}(\xi^j)} \sum_{j=1}^{N_{t_m}} W_{1,m}(\xi^j) 1_{\xi_{t_m}^j \in A} \quad (10)$$

where $N_{t_m}$ is the total number of particles at time $t_m$. The approximation becomes perfect for the model as $N_{t_m}$ increases to infinity. Predicted distributions for some future time conditioned on observations up to the current time are obtained by simulating the particles forward in time without any additional weight adjustment. A past distribution or the path space conditional distribution is approximated by tracking a specific ancestor or the whole the ancestry of each particle and assigning it the current weight. For example, $$P(X_{[0,t]} \in A \mid Y_1, \ldots, Y_m) \approx \frac{1}{\sum_{j=1}^{N_{t_m}} W_{1,m}(\xi_{t_m}^j)} \sum_{j=1}^{N_{t_m}} W_{1,m}(\xi_{t_m}^j) 1_{\xi_{[0,t]}^j \in A} \quad (11)$$

is an approximation for the path of the signal up to time $t_m$ given the observations to time $t_m$. The approximations given hitherto are based upon updated particle locations and are usually of poor quality. Particle weight and position adjustment (i.e., resampling) may then be performed after the weight update but prior to the next weight update to keep the weights from getting too uneven, and facilitate high-quality future estimates.

With the introduction of resampling equation (10) becomes $$P(X_{t_m} \in A \mid Y_1, \ldots, Y_m) \approx \frac{1}{\sum_{j=1}^{N_{t_m}} \tilde{W}_{1,m}(\xi_{t_m}^j)} \sum_{j=1}^{N_{t_m}} \tilde{W}_{1,m}(\xi_{t_m}^j) 1_{\xi_{t_m}^j \in A}, \quad (10)$$

where $\tilde{W}_{1,m}(\xi^j)$ are the weights incorporating the resampling and $\tilde{\xi}_{t_m}^j$ are the particle locations with resampling included.

"Several Particle Methods"

Various particle methods have been implemented. Two such particle methods are described in U.S. Pat. No. 5,933,352 to Salut. Neither of the methods of U.S. Pat. No. 5,933,352 provides smoothing distributions, that is, estimates of the signal state for previous times given the observations up to time. They also provide no estimates of the historical path of the signal.

In one method described in U.S. Pat. No. 5,933,352, the method of adjusting the particles to match the observations is performed solely to maintain a weight value associated with each particle and to modify this weight in accordance with each observation. This method has two sub-methods. In one such sub-method, the influence of past observations on the particle weights is attenuated in time, and in the other sub-method, the influence of past observations on the weights is strictly limited in time.

In another method described in U.S. Pat. No. 5,933,352, the particles are adjusted after each observation by redistributing some or all of their state data. This random redistribution is conducted such that particles with higher weights are more likely to have their state data overwrite the state data of other particles that are part of the redistribution process.

In this manner, the particle states are preferentially collected around the areas of the state space which have the highest estimated conditional probability of containing the signal. While U.S. Pat. No. 5,933,352 does not specifically state this, it can be assumed that the intention is for all particles that are involved in this redistribution to have their weights set to the average of the weights of all involved particles after the redistribution is complete, since this is the condition which will retain the asymptotic optimality of the system.

As U.S. Pat. No. 5,933,352 states, simple particle weighting without redistribution causes degeneration in the output conditional distribution that can be rectified only to some degree by attenuating or limiting the effect of older observations. These actions themselves entail an unavoidable loss of asymptotic optimality in increasing numbers of particles for the filter. If only some particles are considered for redistribution, there are still some degenerative effects working against optimality, and the calculation of the average weight for a subset of the particles is cumbersome. However, a great amount of computation is involved in redistributing all of the particle states at each time step. This effort is especially pronounced if the particle data must travel between processing units in a distributed architecture. Further, redistributing all of the particles is undesirable as it induces undue extra randomness that impairs path space capabilities and downgrades performance as will be explained below.

"Branching Particle Filter"

Another particle filter was discussed in U.S. Patent Application Publication US2002/0198681 A1, published Dec. 26, 2002 to Kouritzin et al., entitled "Flexible efficient branching particle tracking algorithms." The filter described therein may be referred to as the MITACS-PINTS Branching (MIBR) Particle Filter. The MIBR particle filter provides a more controlled method for resampling, which provides improved performance and computer efficiency. Instead of moving the particles after each observation, the MIBR method probabilistically determines whether each particle should be replicated, eliminated, or not manipulated based on the weight determined by the filter and the current observation. The weight may be calculated using equation (8), but subtracting 1 from that value (i.e., $\hat{W}_m(\xi^j)=W_m(\xi^j)-1$) in order to utilize the following routine:

1. If $\hat{W}_m(\xi^j) \geq 0$, then the MIBR copies particle $\xi_j \lfloor \hat{W}_m(\xi^j) \rfloor$ times. It will then add one more particle with probability $\hat{W}_m(\xi^j) - \lfloor \hat{W}_m(\xi^j) \rfloor$.
2. If $\hat{W}_m(\xi^j)<0$, then that particle is eliminated with probability $1-\hat{W}_m(\xi^j)$.
3. Once this resampling has occurred, an efficient unbiased particle control routine is run to return the number of particles to the number of particles prior to resampling. After each resampling procedure, the weights of all particles are reset to a value of 1.

The MIBR filter method is advantageous over the methods described in U.S. Pat. No. 5,933,352 by ensuring that on average the right amount of resampling takes place (i.e., having the probability that a particle is left alone as high as possible without showing weights), and making resampling decisions on a particle-by-particle basis.

However, new methods are always desirable which improve upon the performance of previous known methods (e.g., methods which exceed computational efficiency of other known methods).

SUMMARY OF THE INVENTION

The present invention, according to at least one embodiment, performs an optimal amount of resampling over the entire filtering procedure. In one or more embodiments of the present invention, the filtering described herein may be referred to as the selectively resampling particle (SERP) filter, method, system, etc.

The present invention, in at least one embodiment, provides an implementation of weight and particle position adjustment (i.e., resampling) that is performed to keep the weights reasonably even without introducing excessive resampling noise. The resampling method described herein, at least in one embodiment, is computer efficient.

A real time method for use in estimating a conditional probability distribution for past signal states, current signal states, future signal states, and/or complete pathspace of a non-linear random dynamic signal process according to the present invention is described. The method includes providing sensor measurement data associated with the non-linear random dynamic signal process. The sensor measurement data is dependent on some component of a sampled signal. State data is provided for a plurality of particles as a function of the sensor measurement data that collectively probabilistically represents the state of the non-linear random dynamic signal process at time t. The state data includes at least location and weight information associated with each particle. An estimate of the conditional probability distribution for the signal state of the non-linear random dynamic signal process at time t is computed based on the state data for particles under consideration. The method further includes resampling the particles under consideration upon receipt of sensor measurement data. Resampling the particles includes at least comparing weight information associated with a first particle with weight information associated with a second particle to determine if the state data of the first and second particles is to be adjusted. The first particle is the highest weighted particle under consideration and the second particle is the lowest weighted particle under consideration.

In one embodiment of the method, comparing the weight information associated with the first particle with the weight information associated with the second particle includes determining whether a function based on such weight information for the pair of first and second particles satisfies one or more defined control parameters.

In another embodiment of the method, the method further includes experimentally determining, off-line, optimal values for the one or more defined control parameters. For example, optimal values for the one or more defined control parameters may be determined using at least one of dynamic programming and reinforced learning.

In another embodiment of the method, at least the weight information for the particles under consideration is represented in a hash table data structure to segregate the particles into groups with approximately the same associated weight.

In yet another embodiment of the method, comparing the weight information associated with the first particle with the weight information associated with the second particle includes averaging the weight information associated with both the first and second particles if the state data thereof is to be adjusted.

In still yet another embodiment of the method, resampling the particles under consideration includes repeatedly comparing the state data of particles until weight information associated with all pairs of the particles under consideration satisfies one or more defined control parameters.

Yet further, the method may further include evolving all particles independently of one another after resampling the particles (e.g., evolving all particles independently by simulating the evolution of each particle using explicit solutions). In addition, the method may include reweighting all particles under consideration using sensor measurement data after evolving the resampled particles.

In still another embodiment of the method, the non-linear random dynamic signal process is associated with multiple independent targets. The multiple targets are simulated by separating target paths from the particles under consideration.

Another embodiment of the method may include storing state data of the particles for use in providing particle paths based on ancestral states thereof (e.g., one or more particles may have the same ancestral states). Further, for example, intermediate ancestral state data may be generated at selected instances of time to facilitate calculation of asymptotically optimal smoothing and historical filters. Still further, state data for the earliest stored ancestral states may be discarded if a most recent measurement time is greater than a defined span of time from creation of the state data for the earliest stored ancestral state.

In yet another embodiment, the method further includes estimating a joint conditional probability that the non-linear random dynamic signal process is represented by any set of possible particle paths at various past, current, and future instants of time given sampled data up to the current time. Estimating the joint conditional probability includes assigning weight information of the particles under consideration to each of the possible particle paths with common ancestors being counted in each of particle paths they are in. A pathspace conditional distribution given observations up to a given time is then calculated as a weighted average over such paths.

Further, systems according to present invention may be used to implement one or more functions described above or elsewhere herein. For example, a computer system employing one or more processors (e.g., a parallel processor architecture) may be used. Further, the present invention provides a computer readable medium including a program operable in conjunction with one or more processors of a computer system to implement the filter for use in estimating a conditional probability distribution for past signal states, current signal states, future signal states, and/or complete pathspace of a non-linear random dynamic signal process as described herein.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

BRIEF DESCRIPTION OF FIGURES

FIG. 9 provide further detail regarding miscellaneous functions that may be utilized in one or more embodiments shown in FIGS. 1–8.

DETAILED DESCRIPTION OF THE EMBODIMENTS

Figure 1:
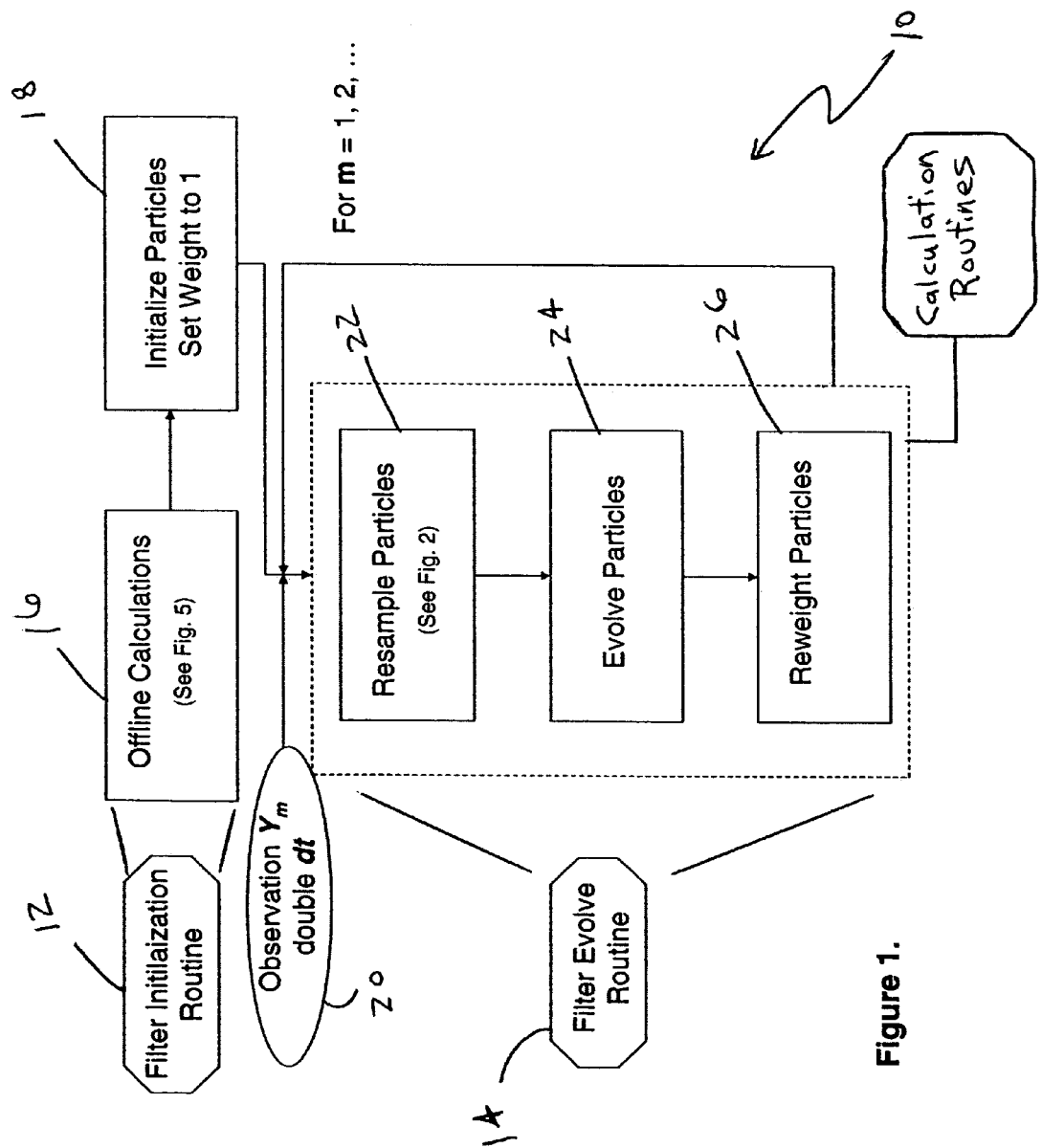
FIG. 1 shows a block diagram of one embodiment of a general SERP filtering procedure according to the present invention.

One or more embodiments of the present invention shall be described with reference to the generalized exemplary SERP filtering procedure 10 shown in FIG. 1. In addition, various embodiments of the procedure shall be described with reference to the FIGS. 2–9.

In general, at least in one embodiment, a particle filter is employed so that particle locations provide signal information to construct an approximated conditional distribution of probabilistic signal state. For an optimal tracking filter, current particles are used with resampled weight values. To construct an optimal predicting filter, copies of the current particles are evolved forward to the time for which the prediction is to occur. A pairwise-interacting selectively resampling particle filter according to the present invention allows the construction of optimal path space smoothing and tracking filters. Ancestor particles retain probabilistic data about the likely historical path of the signal. Then these particles, weighted by their associated ancestor particle weights, provide the approximate asymptotically optimal conditional distribution of the signal state at the collection of previous times. The selectively resampling particle filter according to at least one embodiment of the present invention operates recursively on the observation data, allowing real-time operation of the system. It is asymptotically optimal in increasing numbers of particles. An offline process for the determination of optimal values of the resampling parameter is provided.

Further, generally, the selectively resampling particle (SERP) filter according to the present invention is a compromise between the non-adaptive nature of the classical weighted particle method and the overly random resampling in first interactive particle methods. Such methods are described, for example, in U.S. Pat. No. 5,933,352. Furthermore, at least in one embodiment, the SERP method is capable of determining the extent of resampling for yielding optimal performance in fidelity and/or computation time through its problem-dependent particle system state feedback control mechanism, $\rho_r$. Unlike previous particle methods, the SERP method utilizes resampling that compares particles pairwise, for example, starting from those with the highest and lowest weights, using $\rho_t$ to determine whether or not two particles should be resampled.

The SERP filter accepts a sequence of measurements from sensors, each of which contain noisy, corrupted, and distorted information about the state of the signal (i.e., "noisy measurements"), adjusts its particles in a manner such that they conform to the measurements, and then uses these particles to provide smoothing, tracking, and predicting approximate conditional distributions of the signal state. These distributions can be outputted to a human display interface or to automated systems. Generally, a constant number of particles N can be maintained (e.g. always be easily maintained).

The SERP filter, according to at least one embodiment of the present invention, uses the following algorithm to approximate the optimal tracking filter:

1. Off-line, before the onset of the real time application, solve an optimal control problem to determine state feedback control $\rho_{t_m} = \rho_{t_m}(\{\xi_t^j, 0 \leq j \leq N\})$ or, in the alternative, choose a reasonable collection of resampling parameters $\{\rho_{t_m}\}_{m=1}^{\infty}$.
2. Initialize N particles so that their empirical measure approximates the initial signal distribution well.
3. Initialize N corresponding weights all to 1.
4. For m=1,2,3 . . .
   (a) Resample the particles until the particle weights satisfy $\tilde{W}_{1,m}(\xi^j) < \rho_{t_m} \tilde{W}_{1,m}(\xi^i)$ for all particles i, j.
   (b) Evolve all particles independently of one another using the same stochastic law as the signal.
   (c) Re-weight all particles by incorporating the new information supplied by the observation $Y_m$ using equation (8).
   (d) Calculate the tracking conditional distribution estimate using equation (12).

Similar algorithms are used for smoothing, prediction, and path space conditional distribution computations, for example, as will be apparent from the description herein.

One or more of features or characteristic of the SERP filter include the manner in which the filter resamples particles, the potential use of optimal stochastic control to determine the best practical amount of resampling based on problem-dependent criterion, the underlying data structures used to keep these calculations computationally efficient, and the path separation mechanism used to increase efficiency in the case when the signal includes multiple independent targets or bodies.

The present invention and/or one or more portions thereof may be implemented in hardware or software, or a combination of both. For example, the functions described herein may be designed in conformance with the principles set forth herein and implemented as one or more integrated circuits using a suitable processing technology, e.g., CMOS.

As another example, the present invention may be implemented using one or more computer programs executing on programmable computers, such as computers that include, for example, processing capabilities, data storage (e.g., volatile and nonvolatile memory and/or storage elements), input devices, and output devices. Program code and/or logic described herein is applied to input data to perform functionality described herein and generate desired output information. The output information may be applied as an input to one or more other devices and/or processes, in a known fashion.

Any program used to implement the present invention may be provided in a high level procedural and/or object orientated programming language to communicate with a computer system. Further, programs may be implemented in assembly or machine language. In any case, the language may be a compiled or interpreted language.

Any such computer programs may preferably be stored on a storage media or device (e.g., ROM or magnetic disk) readable by a general or special purpose program, computer, or a processor apparatus (e.g., one or more processors configured in any known architecture) for configuring and operating the computer when the storage media or device is read by the computer to perform the procedures described herein. The system may also be considered to be implemented as a computer readable storage medium, configured with a computer program, where the storage medium so configured causes the computer to operate in a specific and predefined manner to perform functions described herein.

In view of the above, it will be readily apparent that the functionality as described herein may be implemented in any manner as would be known to one skilled in the art.

FIG. 1 shows a block diagram of one embodiment of a general SERP filter process 10 according to the present invention. The SERP filter process 10 generally includes a filter initialization routine 12, a filter evolve routine 14, and calculation routines 15. The filter initialization routine 12 includes calculations (e.g., off-line calculations) (block 16) to determine one or more defined control parameters (e.g., to solve an optimal control problem to determine state feedback control $\rho_{t_m} = \rho_{t_m}(\{\xi_t^j, 0 \leq j < N\})$ or, in the alternative, choose a reasonable collection of resampling parameters $\{\rho_{t_m}\}_{m=1}^{\infty}$).

Further, the filter initialization routine 12 is used to initialize the weight for a plurality of particles that collectively probabilistically represent the signal process (block 18). For example, the weight is initialized to 1. Various embodiments of initialization routines are further described herein.

After initialization, observations 20 are received and the filter evolve routine 14 is continuously performed (e.g., the filter distribution is updated upon receipt of observations 20). The filter evolve routine 14 includes a process to resample the particles under consideration (block 22), a process to evolve the particles under consideration (block 24), and a process to reweight the particles (block 26). Various embodiments of such processes are further described herein.

The filter distribution of the plurality of particles under consideration can be used by one or more calculation routines 15 to calculate, for example, conditional distribution estimates (e.g., using equation (12)). As previously indicated, similar algorithms are used for smoothing, prediction, and path space conditional distribution computations, for example, as will be apparent from the description herein.

"SERP Resampling Procedure"

Figure 2:
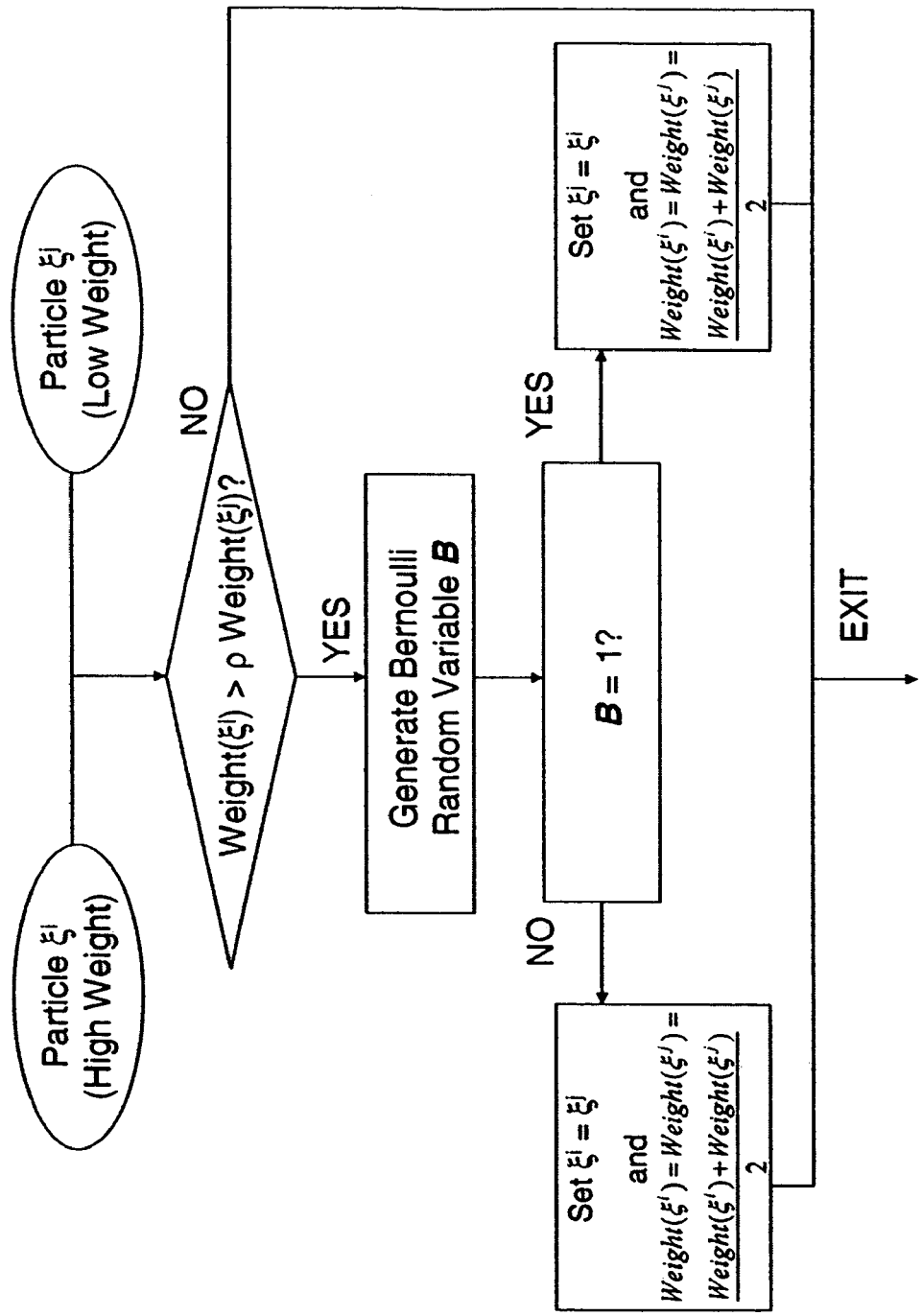
FIG. 2 shows one embodiment of an exemplary SERP resampling procedure according to the present invention as generally shown in FIG. 1.

FIG. 2 shows how a resampling procedure (block 22) operates for two given particles that are to be resampled. Generally, a particle in the SERP method simply runs as a weighted particle until such time as its weight differs significantly from the majority of the particle weights. In particular, upon receiving an observation, the highest weighted particle $\xi^j$ is compared to the lowest weighted particle $\xi^i$. If the ratio in weights between the two particles is greater than the current $\rho$ (e.g., $\rho$ can depend upon time and particle system state), then the two particles are resampled. For example, in the path space case, a Bernoulli trial B with $$P(B=1) = \frac{\hat{w}_{1,m-1}^j}{\hat{w}_{1,m-1}^i + \hat{w}_{1,m-1}^j}$$

is created to determine whether both particles should take on the previous path space state $\xi_{[t_0,t_{m-1}]}^i$ or $\xi_{[t_0,t_{m-1}]}^j$. Here, $\hat{W}^{1,m-1j}$ is shorthand for $\hat{W}_{1,m-1}(\xi^j)$.

To avoid confusion, the weights of the particles are renamed the following after resampling $\overline{W}_{1,m-1}^i$ and $\overline{W}_{1,m-1}^j$. If B=1, then both particles will be given the state of the higher weighted particle $\xi_{[t_0,t_{m-1}]}^j$. Otherwise, they are given the state of the lower weighted particle. In either case, the weights of both particles are reset to the average of the two original particle weights:

$$\overline{W}_{1,m-1}^i = \overline{W}_{1,m-1}^j = \frac{\tilde{W}_{1,m-1}^i + \tilde{W}_{1,m-1}^j}{2}, \quad (13)$$

their positions being either at the site of the precombination lower or higher weighted particle.

The resampling routine is valid since if one averages the two particle weighted point masses, after recombination over the introduced Bernoulli random variable, one returns to the setup prior to the pair resampling. This pairwise resampling procedure is repeated until all weights are within a factor ρ of each other.

"SERP Particles Evolution"

Forward evolution (block 24) of the particle state is simulated according to the stochastic law of the signal process, or if that is not available then some perturbed approximate model of the signal process.

The time period for this forward evolution is given by the length of time between the preceding observation and the observation presently under consideration. While this need not be constant for different observation intervals, it can be taken as a constant ε>0 in this description to avoid unnecessary complication.

There are a number of methods that can be used to evolve the particles, including Euler approximations for SDEs, Mihlstein approximations for SDEs, and discrete state Markov chain approximation for any Markov process. Any of these and others can be used with SERP procedure to convert each $\xi_{[t_0,t_{m-1}]}^j$ to $\xi_{[t_0,t_m]}^j$.

First, an explicit solution approach that, while less general than the aforementioned methods, applies in many practical situations and can produce an extremely efficient computer algorithm. Then, a path separation technique for the case where the signal is composed of multiple independent targets is presented.

With respect to the explicit solution approach, the expanding subject of explicit solutions to SDEs is used to simulate the particles in an efficient near-exact manner. In M. A. Kouritzin, "Exact infinite dimensional filters and explicit solutions," *Stochastic Models*, Eds. Luis G. Gorostiza and B. Gail Ivanoff, pp. 265–282 (2000), for example, the SDEs that admit solutions that are a function of a finite number multiple stochastic integrals have been described. If the signal or a near perturbation corresponds to one of these SDEs, then the explicit solution can be used to propagate the particles. As such, one may simply simulate the stochastic integrals and then apply the mapping. In many cases, one simple Wiener stochastic integral and a determinable function suffice. In this case, one can immediately simulate the jth particle by simulating $$\int_0^\varepsilon f_s dv_s^j$$

as a centered Gaussian random variable and then apply the mapping. This means that no time stepping between the observations is required. In other cases when you have more multiple stochastic integrals, more computations are required, but often, much fewer than using alternatives like Euler approximations.

With respect to multiple independent targets, one can separate particle paths $\{\xi_{[0,t]}^i\}_{i=1}^m$ from particles $\{\xi^j\}_{j=1}^N$, allowing effective reuse of a path in many particles and saving many computer cycles. The particles $\{\xi^j\}$ are reduced to a collection of indices indicating which paths it includes. When the total weight for a path becomes relatively large, it is split into two paths with conditionally independent evolutions after the split. Low or zero weighted paths may be removed.

"SERP Reweighting Procedure"

After the particles have been resampled (block 22) and evolved (block 24), the information from the new observation (block 20) must be incorporated into the weights of the particles under consideration (e.g., reweight particles process 26). The current weight of the particle is recognized and multiplied by the weight of the observation applied to the particle:

$$\tilde{W}_{1,m}^i = W_m^i \overline{W}_{1,m-1}^i \quad (14)$$

where $W_m^i$ corresponds to either equation (8) or equation (9), and $\overline{W}_{1,m-1}^i$ is the current weight of the particle after resampling.

The conditional distribution approximations using the particle $\xi^j$ with weights $\tilde{W}_{1,m}$ after the mth observation may be calculated as $$P(X_{t_m} \in A \mid Y_1, \ldots, Y_m) \approx \frac{\sum_{j=1}^N \tilde{W}_{1,m}(\xi^j) 1_{\xi_{t_m}^j \in A}}{\sum_{j=1}^N \tilde{W}_{1,m}(\xi^j)} \quad (15)$$

"SERP Data Structures"

Different computer implementations for the SERP method affect both fidelity and computation time performance greatly. The following data structures, used to implement the SERP method, are one embodiment that can efficiently used.

"Particle Representation"

Figure 3:
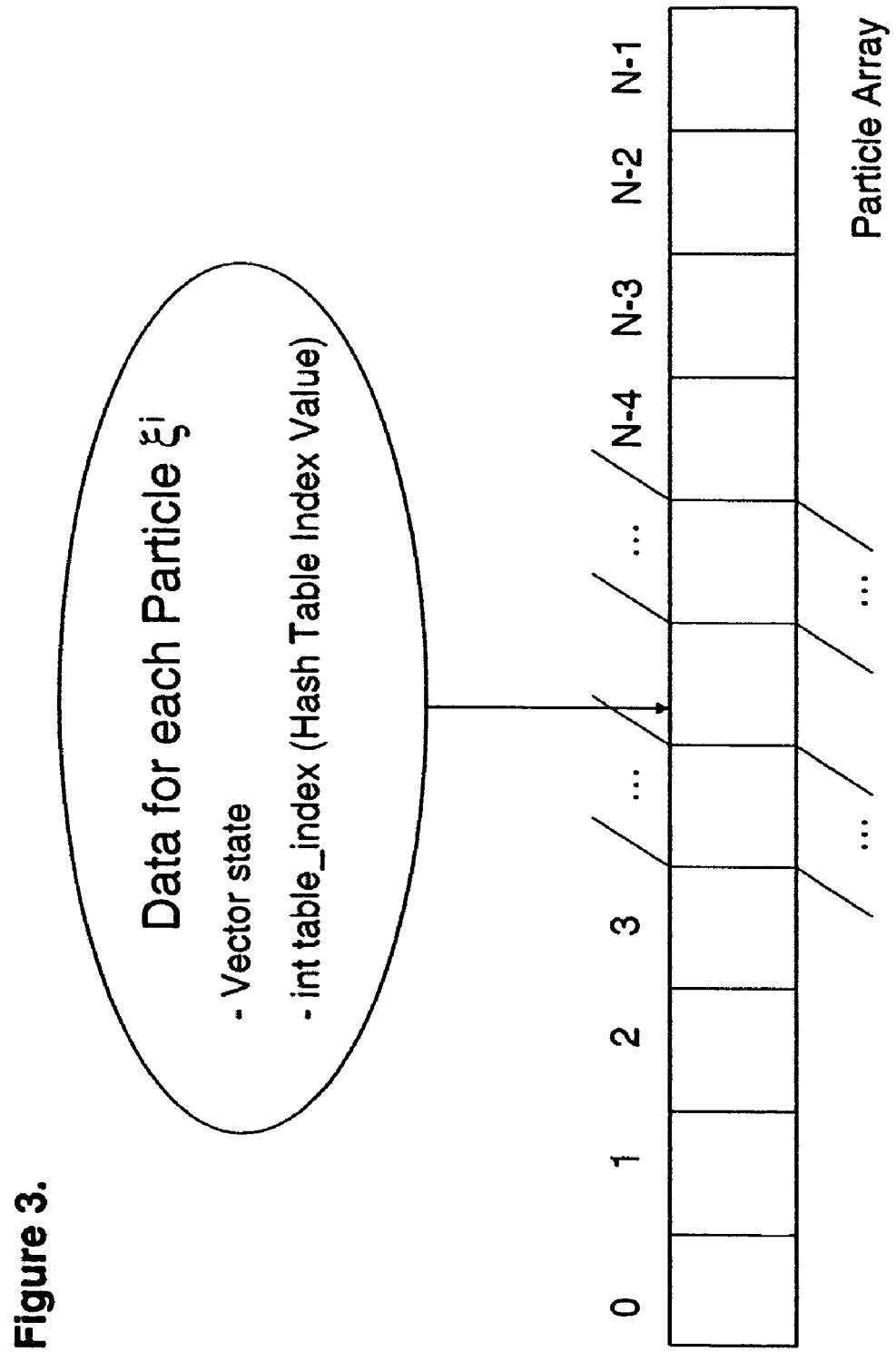
FIG. 3 shows one exemplary embodiment of a particle representation for a SERP filtering procedure such as that shown generally in FIG. 1.

As shown in FIG. 3, a particle in the SERP filter is represented by a data structure that associates its state information and the corresponding current weight or the hash table index corresponding to this weight. All of these structures are stored as an array for methods that require quick particle iterations (e.g., such as for conditional distribution computations, particle evolutions and so on).

"Weight Representation"

Since floating point numbers are used to represent the weights, their representation is limited to the precision and overflow limitations for floating point number representations on a computer.

The weight $\tilde{W}_{1,m}(\xi^j)$ for particle $\xi^j$ is represented by a hash table index, with a hashing function $$H(\xi^j) = \lfloor \log_{1+\alpha}(\tilde{W}_{1,m}(\xi^j)) \rfloor \quad (16)$$

where $\lfloor \cdot \rfloor$ denotes the highest integer no greater than •, and $\alpha$ is a parameter for precision of the represented weights. Greater precision occurs as $\alpha \to 0$ and this creates more lists that can either increase or decrease speed slightly. Experimentation is used to achieve a reasonable value.

This approximated representation alleviates much of the floating point constraints by reducing many exponential floating point operations to relatively fast integer (hash table index) arithmetic. Error in fidelity due to the approximation of weights as hash table bin indexes is negligible when a small $\alpha$ value is chosen.

The collection of hash table bins with the number of particles for each bin represents the distribution of weights. Because of stochastic nature of the problem, the distribution tends to drift in some direction (especially after localization).

Figure 4:
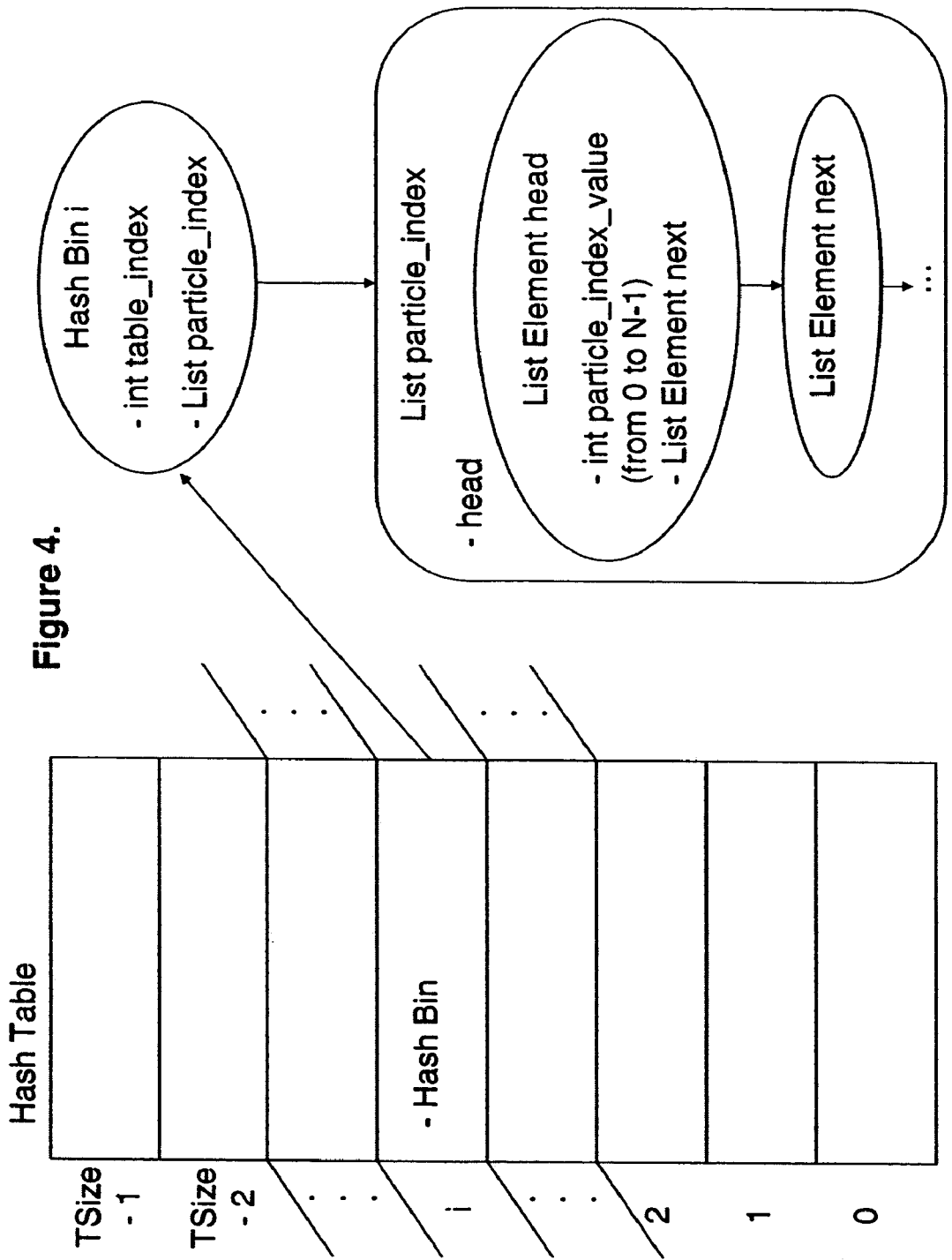
FIG. 4 shows one exemplary illustration of a hash table data structure used in a SERP filtering procedure such as that shown generally in FIG. 1.

A list-hash-table is used to represent the collection of hash table bins. FIG. 4 depicts the structure and organization of this hash table.

For any given $\alpha$ value, the size of the hash table is created proportional to the maximum weight a particle can be given within the constraints of floating-point computer representation. The following calculation shows the general table size function:

$$\frac{T_{size}}{2} = \frac{\log(MaxDouble)}{\log(1+\alpha)} \quad (17)$$

where MaxDouble is the maximum double floating point value available on the computer running the program. This result on the right side of the equation is doubled so that appropriate space is given for all possible negative exponential values. Variants of equation (17) may be used to ensure that the summation of all the weights of particles do not overflow the architecture's maximum floating point representation as well.

The actual scalar value of the weight for a particle is not important when running the resampling routine. Instead, the difference in hash indices between the two particles is all that is needed. By applying equation (16) to the $\rho$ value (the result being dubbed $\rho_{int}$), the difference between the highest and lowest particle indices can be easily compared to the $\rho_{int}$ to determine whether or not resampling needs to occur.

As such, if $H_{max}$ denotes the hash table index of the highest weighted particle and $H_{min}$ denotes the hash table index of the lowest weighted particle, resampling will occur if $H_{max} - H_{min} > \rho_{int}$.

"Offline Calculations"

To improve efficiency, many time-consuming calculations related to the data structures are pre-calculated upon filter initialization (block 12). Once the $\alpha$ value has been supplied to the filter, the weight for each hash bin index is calculated using the hashing function. In this manner, weight calculation costs reduce to access times into floating point arrays.

As well, a significant portion of the calculation of new indices for resampled particles is precalculated based upon the $\alpha$ value. For two given particles $\xi^i$ and $\xi^j$ that are to be resampled, their new indices into the hash table depends on the difference between their current indices and the value of the lowest weight particle index $H_{min}$. The portion of the calculation that depends on their difference is precalculated based on the table size and the value of $\alpha$.

"Historical Filtering"

The SERP filter may be used as a historical or smoothing filter. To provide for these capabilities, the filter can store an ancestral chain for each particle. An ancestral chain is simply a list of past states of each particle. Typically the ancestral chain takes the form of a linked list of states. Each particle will be the head of a list of states. The first element of the list will be the state at the current time step, followed by the states at each previous time step, so at time step $t_k$, the list for particle $\xi^i$ will be $\langle s(\xi_j^i), s(\xi_{tk-1}^i), \ldots, s(\xi_{t0}^i) \rangle$, where $s(\ )$ represents the state information of a particle.

In the event of resampling, a particle $\xi^i$ will have its state overwritten with that of $\xi^j$. In this case, the ancestral chain for $\xi^i$ is deleted and replaced with a link into the ancestral chain for $\xi^j$. After resampling, both $\xi^i$ and $\xi^j$ will continue to build their ancestral chains independently. They will only have the set of states from before the resampling in common. Thus, after extensive resampling, there may be many particles which link into the same ancestral chain at different points.

Depending on the particular application needs, it may be possible to save storage capacity in several ways. First, for example, the ancestral chain may be truncated to a certain age. In this case, all state information for time $t_j$ will be deleted at time $t_k$ if k−j is greater than some threshold, n. This will limit the historical information to the last n time steps. Second, for example, state information may only be added to the ancestral chains every n time steps. This will reduce the accuracy of the historical information for times near time steps that were not stored, but will not affect the accuracy at times near that of the stored states.

To find the state distribution at some time $t<t_k$, where $t_k$ is the current time, the filter makes use of the ancestral chain. First, the filter finds a member of each of the ancestral chains for time $t_i$ so that $t_i<t$ and is the most recent member to satisfy that inequality. It then evolves a copy of the states at that time forward to time t. Finally, a distribution can be calculated using these evolved states associated with the weights of their corresponding particles.

"Optimal ρ determination"

Figure 5:
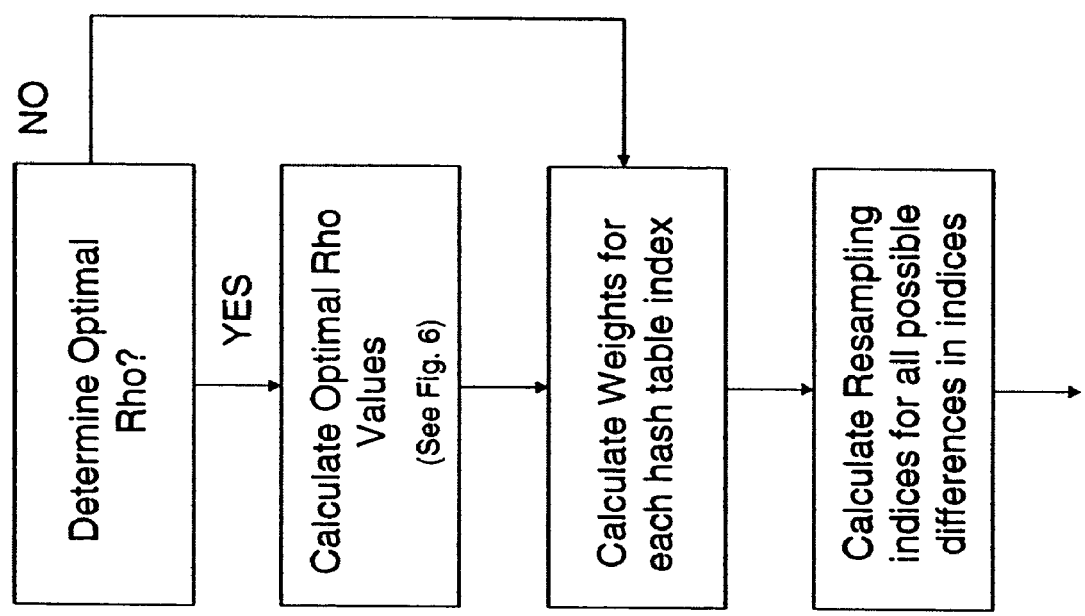
FIG. 5 shows one exemplary block diagram of offline precalculation routines that a SERP filtering procedure such as that shown generally in FIG. 1 may utilize according to the present invention.

One feature of the SERP filter is the problem-customizable resampling control $\rho$. The determination of the optimal $\rho$ as a function of certain features of the particle system state is a stochastic control problem, where in the methods described below can be solved offline and/or often experimentally. However, it can be solved mathematically in some cases. Generally, it is better to solve it experimentally using a random number generator used in the particle filter. The block diagram of FIG. 5 show one embodiment for the off-line determination of optimal $\rho$.

The most pertinent information about the state of the filter at time $t_k$ is denoted by a set of feedback state variables $\Phi_{t_k} = \{\phi_{t_k}^1, \ldots, \phi_{t_k}^n\}$ which attempt to capture the important information about the state of the particle system at time $t_k$. An example of a feedback state variable is the variance of the particles in the filter. For the sake of simplicity and ease of implementation, feedback state variables are approximated by discrete values. Methods to choose the set of possible values could include hand-picking all of them, choosing them arithmetically or geometrically, and so on.

A policy $\pi$ is a mapping from feedback states $\Phi_{t_k}$ to actions $\rho_{t_k}$. An optimal policy $\pi^*$ is a policy where each mapping is optimal. Using $\rho=\pi(\Phi_{t_k})$ to determine the amount of resampling, a filter cycle (e.g., resample, evolve, and reweight) leaves the filter in some new state $\Phi_{t_{k+1}}$. A cost function $C_\Phi(\rho_{t_k})$ can be used to compute the relative expense of selecting a particular $\rho$ for a given iteration if the iteration started with a particle system giving rise to feedback state $\Phi$. Since optimization is done offline, the cost function can include, for example, comparisons to the signal and the localization time, as well as the variance of the particles and computation time.

The one-step optimal policy for time $t_k$ is $$\pi_0^* \equiv arg\ min_\pi C_{\Phi_{t_k}}(\pi(\Phi_{t_k})) \forall \Phi_{t_k} \quad (18)$$

The optimal ith-step policy is then defined as:

$$\pi_i^* \equiv arg\ min_\pi V_i(\pi(\Phi_{t_k})) \forall \Phi_{t_k} \quad (19)$$

$V_i(\pi(\Phi_{t_k}))$ is the ith-step discounted cost. One possible definition is $$V_i(\pi(\Phi_{t_k})) = \gamma(0)\, C_{\Phi_{t_k}}(\pi(\Phi_{t_k})) + \sum_{j=1}^{i} \gamma(j)\, C_{\Phi_{t_{k+j}}}(\pi_{i-j}^*(\Phi_{t_{k+j}})) \quad (20)$$

where $\gamma(j)$ is a discounting function such that $$\sum_{j=0}^{\infty} \gamma(j) < \infty$$

and $\Phi_{t_{k+1}}, \Phi_{t_{k+2}}, \Phi_{t_{k+3}}, \ldots$ are the future feedback states that result by applying the policy $\Pi, \Pi_{i-1}^*, \Pi_{i-2}^*, \ldots$. Typical values of $\gamma(i)$ are $(1-a)a^i$ for some $a \in (0,1)$. In this case, $v_i(\pi(\Phi_{t_k})) = (1-a)c_{\Phi_{t_k}}(\pi(\Phi_{t_k})) + av_{i-1}(\Pi^*(\Phi_{t_{k+1}}))$.

The goal is to minimize the infinite time horizon cost:

$$\pi^*(\Phi_{t_k}) \equiv \lim_{i \to \infty} V_i(\pi(\Phi_{t_k}))\ \forall\ \Phi_{t_k} \quad (21)$$

Figure 6:
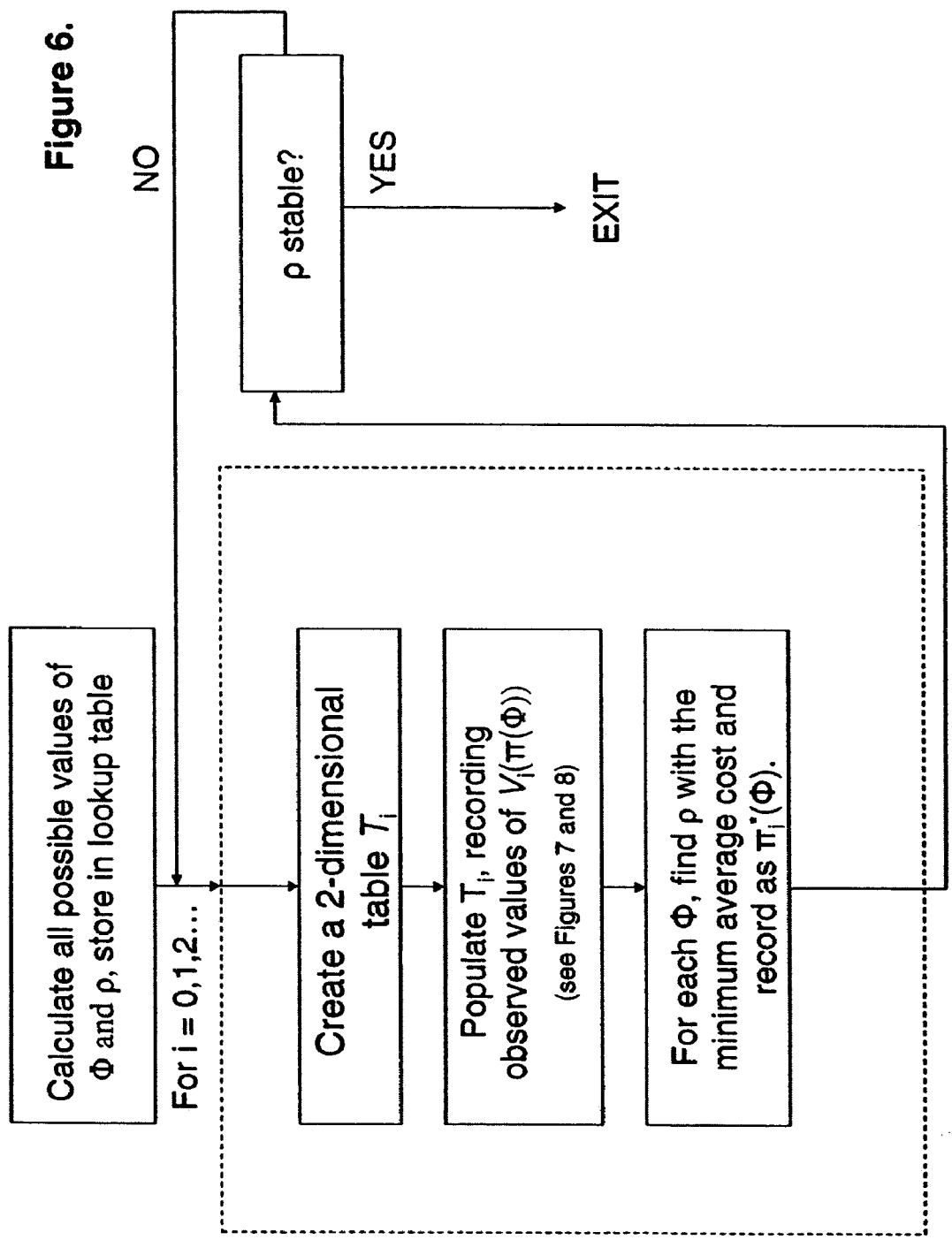
FIGS. 6, 7, and 8 provide further detail for exemplary offline procedures for optimizing the control mechanism $\rho$ in offline precalculation routines such as those shown in FIG. 5.

Two methods are described for finding an optimal policy. The first method is a dynamic programming solution, and the second method is a reinforcement learning solution. Both algorithms fit into the following algorithmic structure as shown in FIG. 6:

1. Determine all possible values of $\Phi$ and $\rho$.
2. For each i=0,1,2,3, . . .
   (a) Create a 2-dimensional table data structure $T_i$, indexed by discrete state and $\rho$ values.
   (b) Populate $T_i$, recording observed values of $V_i(\pi(\Phi))$.
   (c) For each state $\Phi$, find the $\rho$ value that has the minimum average ith step discounted cost. This will be $\pi_i^*(\Phi)$.
   (d) Determine whether the $\rho$ values have become stable over the previous k iterations (for some k>2).

That is, an attempt is made to determine the optimal policy for backsteps one, two, three, and so on, stopping after a maximum number of backsteps have been calculated, or until the $\rho$ values chosen become stable for all possible $\Phi$ over several time steps.

The stability of the $\rho$ values after i>k time iterations is defined as:

$$S_i = \sum_\Phi \sum_{j=0}^{k-1} (\rho_{t_{i-j}} - \rho_{t_{i-j-1}})^2 \quad (22)$$

for some fixed k, where $$\sum_\Phi$$

means a summation over all possible states.

If $S_i$ is less than some parameter $\overline{S}$, then the program will terminate and record the current minimal $\rho$ values for all $\Phi$. Alternatively, the program could terminate when the percent change in stability over the last two (or more) steps is below a certain threshold.

Figure 7:
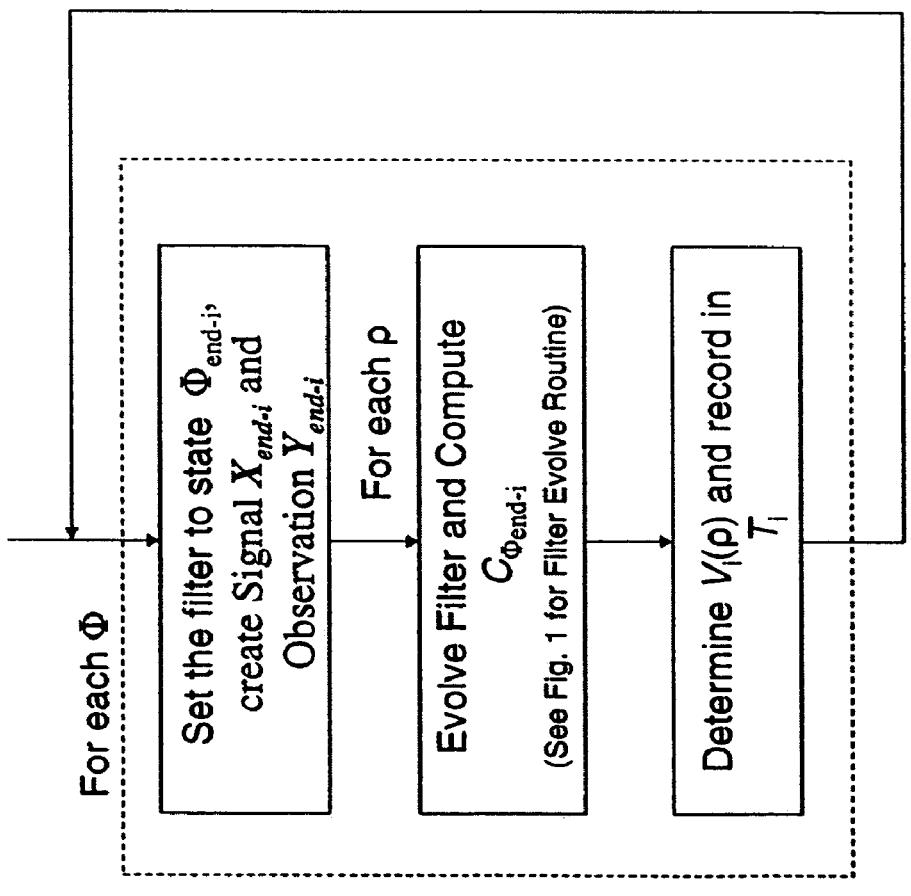
Figure 8:
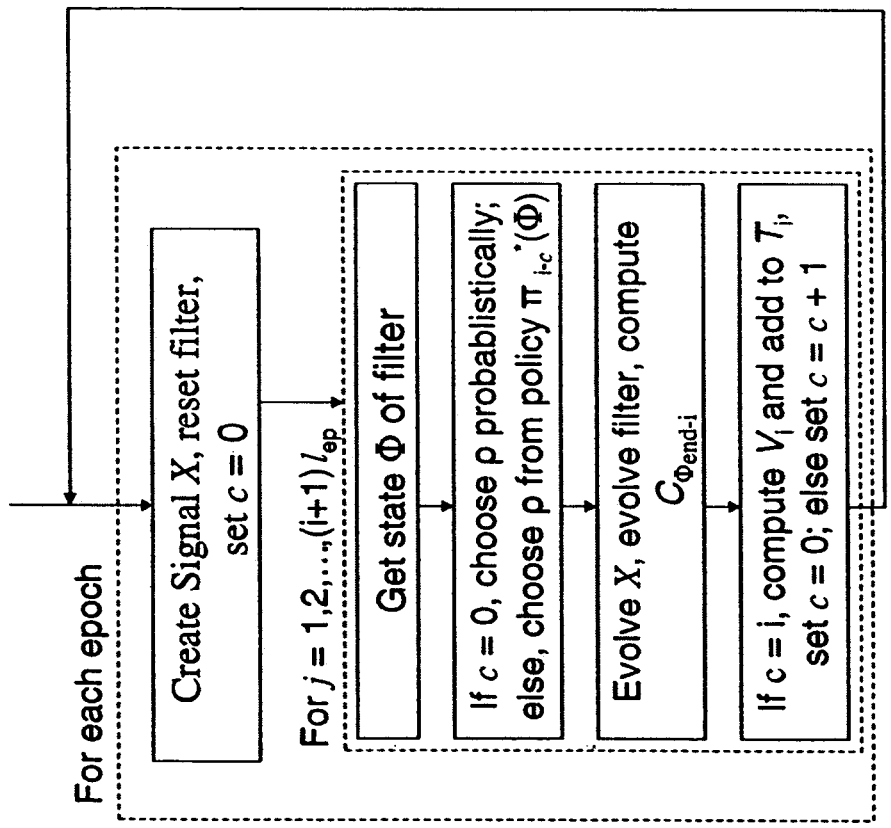

FIG. 7 shows the table population scheme performed in the dynamic programming approach. FIG. 8 shows the population scheme performed in the reinforcement learning approach.

"Dynamic Programming"

This approach starts at some final time step $t_{end}$, and then one iterates back in time by one time step per iteration. The future cost is determined by looking at the ending value of $\Phi_{t_{m+1}}$ after the iteration has been completed and then using the forward costs already computed up to time $t_{end}$.

The dynamic programming method as shown in FIG. 7 fits into the above framework, using the following table population algorithm:

1. For each possible value of $\Phi$:
   (a) Set the filter to match the state denoted by $\Phi_{t_{end-i}}$.
   (b) Create a plausible signal based on $\Phi_{t_{end-i}}$ and generate an associated observation from the signal.
   (c) For each possible value of $\rho$:
      i. Evolve the filter one iteration using the observation generated.
      ii. Calculate $$C_{\Phi_{t_{end-i}}}(\rho).$$

iii. Determine $V_i(\rho)$ according to equation 20.

Note that when the observed values of $V_i(\rho)$ are recorded, the associated cost $$C_{\Phi_{t_{end-i}}}(\rho)$$

should be stored as well, since these are needed in the calculations of $V_j$, j>i.

"Reinforcement Learning"

The other approach of doing optimal $\rho$ value determination is by learning from experience as shown generally in FIG. 8. In the previous method, the internal data structures of the filter were set to match specific states. While this allows for all possible states to be included in the determination algorithm, the data in the filter's structures is determined artificially and may not accurately reflect the filter in practice. Signals are also generated artificially. To overcome these potential problems, we describe a reinforcement learning algorithm that does optimal ρ determination by using instances of real signals. Again, the algorithm fits in the general framework, with only the table population step being specialized.

Table population includes a number of epochs, with each epochs including a fixed number, $l_{ep}$, of data collecting steps.

1. For each epoch,
   (a) Create a new signal.
   (b) Reset the filter to its initial state.
   (c) Set c:=0.
   (d) For j=1,2, . . . , (i+1)·$l_{ep}$,
      i. Get the state of the filter.
      ii. If c=0, then choose the ρ value to use for resampling by calling a function ChooseRho with the filter's state as the argument. Otherwise, determine ρ from the appropriate previously determined policy, i–c.
      iii. Evolve the signal, evolve the filter using the just-determined ρ, and compute the cost of the action.
      iv. If c=i, then compute the $V_i$ value to store in $T_i$, add it to $T_i$, and set c:=0. Otherwise, increment c by 1.

The function ChooseRho determines the value of ρ to use for the next filter evolution. Initially, one may explore the ρ-space, but as simulations progress, one may explore less and focus on using values of ρ that have been found to be "good," through, for example, lower costs ($V_i$) and higher statistical confidence. If a score $K_{\rho_j,\tau,\Phi}$ (where τ is a time index) is assigned to each $\rho_j$, probabilities can be assigned as follows:

$$P(\text{action} = \rho_j \mid \tau, \phi) = \frac{K_{\rho_j,\tau,\phi}}{\sum_\rho K_{\rho,\tau,\phi}} \quad (23)$$

The value of ρ to use can then be chosen based on this distribution.

To deal with the possibility that not all states will be experienced, function approximators based on the determined ρ values for a given step i to approximate the optimal policy $\pi_i^*$ may be used. Such function approximators could be as simple as lookup tables with default values for missing entries, or as complex as machine learning mechanisms such as artificial neural networks or support vector machines, trained on the data collected. Such function approximators could also be created based on data collected in the dynamic programming approach. These would be used in practice in case the filter experiences a state that was not included in the discretization scheme.

All patents and references disclosed herein are incorporated by reference in their entirety, as if individually incorporated. The preceding specific embodiments are illustrative of the practice of the present invention. It is to be understood, therefore, that other expedients known to those skilled in the art or disclosed herein may be employed without departing from the invention or the scope of the appended claims.

What is claimed is:

1. A real time method for use in estimating a conditional probability distribution for past signal states, current signal states, future signal states, and/or complete pathspace of a non-linear random dynamic signal process, the method comprising:
   providing sensor measurement data from one or more sensors associated with the non-linear random dynamic signal process, wherein the sensor measurement data is dependent on some component of a sampled signal;
   providing state data for a plurality of particles as a function of the sensor measurement data that collectively probabilistically represents the state of the non-linear random dynamic signal process at time t, wherein the state data comprises at least location and weight information associated with each particle;
   computing an estimate of the conditional probability distribution for the signal state of the non-linear random dynamic signal process at time t based on the state data for particles under consideration; and
   resampling the particles under consideration upon receipt of sensor measurement data, wherein resampling the particles comprises at least comparing weight information associated with a first particle with weight information associated with a second particle to determine if the state data of the first and second particles is to be adjusted, wherein the first particle is the highest weighted particle under consideration and the second particle is the lowest weighted particle under consideration.

2. The method of claim 1, wherein comparing the weight information associated with the first particle with the weight information associated with the second particle comprises determining whether a function based on such weight information for the pair of first and second particles satisfies one or more defined control parameters.

3. The method of claim 2, wherein the method further comprises experimentally determining, off-line, optimal values for the one or more defined control parameters.

4. The method of claim 3, wherein the method further comprises determining optimal values for the one or more defined control parameters using at least one of dynamic programming and reinforced learning.

5. The method of claim 1, wherein at least the weight information for the particles under consideration is represented in a hash table data structure to segregate the particles into groups with approximately the same associated weight.

6. The method of claim 1, wherein comparing the weight information associated with the first particle with the weight information associated with the second particle comprises averaging the weight information associated with both the first and second particles if the state data thereof is to be adjusted.

7. The method of claim 1, wherein resampling the particles under consideration comprises repeatedly comparing the state data of particles until weight information associated with all pairs of the particles under consideration satisfies one or more defined control parameters.

8. The method of claim 1, wherein the method further comprises evolving all particles independently of one another after resampling the particles.

9. The method of claim 8, wherein the method further comprises reweighting all particles under consideration using sensor measurement data after evolving the resampled particles.

10. The method of claim 8, wherein evolving all particles independently comprises simulating the evolution of each particle using explicit solutions.

11. The method of claim 1, wherein the non-linear random dynamic signal process is associated with multiple independent targets, and wherein the method further comprises simulating the multiple targets by separating target paths from the particles under consideration.

12. The method of claim 1, wherein the method further comprises storing state data of the particles for use in providing particle paths based on ancestral states thereof, wherein one or more particles may have the same ancestral states.

13. The method of claim 12, wherein intermediate ancestral state data is generated at selected instances of time to facilitate calculation of asymptotically optimal smoothing and historical filters.

14. The method of claim 12, wherein state data for the earliest stored ancestral states is discarded if a most recent measurement time is greater than a defined span of time from creation of the state data for the earliest stored ancestral state.

15. The method of claim 1, wherein the method further comprises estimating a joint conditional probability that the non-linear random dynamic signal process is represented by any set of possible particle paths at various past, current, and future instants of time given sampled data up to the current time, wherein estimating the joint conditional probability comprises assigning weight information of the particles under consideration to each of the possible particle paths with common ancestors being counted in each of particle paths they are in, wherein a pathspace conditional distribution given observations up to a given time is then calculated as a weighted average over such paths.

16. A computer readable medium comprising a program operable in conjunction with one or more processors of a computer system to implement a filter for past signal states, current signal states, future signal states, and/or complete pathspace of a non-linear random dynamic signal process, wherein the program is operable to:
   recognize sensor measurement data provided from one or more sensors associated with the non-linear random dynamic signal process, wherein the sensor measurement data is dependent on some component of a sampled signal;
   provide state data for a plurality of particles as a function of the sensor measurement data that collectively probabilistically represents the state of the non-linear random dynamic signal process at time t, wherein the state data comprises at least location and weight information associated with each particle;
   compute an estimate of the conditional probability distribution for the signal state of the non-linear random dynamic signal process at time t based on the state data for particles under consideration; and
   resample the particles under consideration upon receipt of sensor measurement data, wherein resampling the particles comprises at least comparing weight information associated with a first particle with weight information associated with a second particle to determine if the state data of the first and second particles is to be adjusted, wherein the first particle is the highest weighted particle under consideration and the second particle is the lowest weighted particle under consideration.

17. The computer readable medium of claim 16, wherein the program is further operable to determining whether a function based on such weight information for the pair of first and second particles satisfies one or more defined control parameters.

18. The computer readable medium of claim 16, wherein at least the weight information for the particles under consideration is represented in a hash table data structure to segregate the particles into groups with approximately the same associated weight.

19. The computer readable medium of claim 16, wherein the program is further operable to average the weight information associated with both the first and second particles if the state data thereof is to be adjusted.

20. The computer readable medium of claim 16, wherein the program is further operable to repeatedly compare the state data of particles until weight information associated with all pairs of the particles under consideration satisfies one or more defined control parameters.

21. The computer readable medium of claim 16, wherein the program is further operable to evolve all particles independently of one another after resampling the particles.

22. The computer readable medium of claim 21, wherein the program is further operable to reweight particles under consideration using sensor measurement data after evolving the resampled particles.

23. The computer readable medium of claim 22, wherein the program is further operable to evolve all particles independently by simulating the evolution of each particle using explicit solutions.

24. The computer readable medium of claim 16, wherein the non-linear random dynamic signal process is associated with multiple independent targets, and wherein the program is further operable to simulate the multiple targets by separating target paths from the particles under consideration.

* * * * *